US008717888B2

(12) United States Patent
Sankar et al.

(10) Patent No.: US 8,717,888 B2
(45) Date of Patent: May 6, 2014

(54) OPTIMIZATIONS FOR N-WAY GATEWAY LOAD BALANCING IN FABRIC PATH SWITCHING NETWORKS

(75) Inventors: Ramkumar Sankar, Bangalore (IN); Naveen Pethandlahally Narayan Gowda, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 13/331,626

(22) Filed: Dec. 20, 2011

(65) Prior Publication Data

US 2013/0094357 A1 Apr. 18, 2013

(30) Foreign Application Priority Data

Oct. 18, 2011 (IN) .......................... 2986/DEL/2011

(51) Int. Cl.
*H04L 12/28* (2006.01)
(52) U.S. Cl.
USPC ........... 370/230; 370/389; 370/392; 370/401; 370/466
(58) Field of Classification Search
USPC .......................................................... 370/230
See application file for complete search history.

(56) References Cited

U.S. PATENT DOCUMENTS

| | | | |
|---|---|---|---|
| 7,716,366 B2 * | 5/2010 | Regan et al. ................... | 709/240 |
| 8,014,290 B2 * | 9/2011 | Ji .................................. | 370/237 |
| 8,077,709 B2 * | 12/2011 | Cai et al. ....................... | 370/389 |
| 8,155,131 B2 * | 4/2012 | Yan et al. ...................... | 370/401 |
| 8,166,187 B2 * | 4/2012 | Gowda et al. ................. | 709/230 |
| 8,259,720 B2 * | 9/2012 | Farinacci et al. .............. | 370/392 |
| 8,315,157 B2 * | 11/2012 | Moreno et al. ................. | 370/221 |
| 2001/0048661 A1 * | 12/2001 | Clear et al. ..................... | 370/218 |
| 2002/0176363 A1 * | 11/2002 | Durinovic-Johri et al. ... | 370/237 |
| 2007/0121617 A1 * | 5/2007 | Kanekar et al. ............... | 370/389 |
| 2008/0186968 A1 | 8/2008 | Farinacci et al. | |
| 2008/0225699 A1 * | 9/2008 | Lee ................................ | 370/218 |
| 2009/0257440 A1 | 10/2009 | Yan et al. | |
| 2010/0098082 A1 * | 4/2010 | Sampath et al. .............. | 370/392 |
| 2010/0220620 A1 * | 9/2010 | Timm et al. ................... | 370/252 |
| 2011/0116509 A1 * | 5/2011 | Moreno et al. ................ | 370/401 |
| 2012/0300782 A1 * | 11/2012 | Farinacci et al. ............. | 370/392 |

FOREIGN PATENT DOCUMENTS

WO 2009045130 A1 4/2009

OTHER PUBLICATIONS

International Search Report for application PCT/US2012/060792 dated Feb. 8, 2013.

* cited by examiner

*Primary Examiner* — Ian N Moore
*Assistant Examiner* — Lakeram Jangbahadur
(74) *Attorney, Agent, or Firm* — Patterson & Sheridan, LLP (57) ABSTRACT

Techniques are disclosed for providing n-way gateway load-balancing in a fabric path switching Systems (FSS), such as a layer 2 multipath (L2MP) network in a large data center. An access switch in a L2MP network may learn an emulated switch IDs through FHRP "hello" messages sent by an "active" gateway router for each FHRP group. Further, the access switch may learn which links an emulated switch is reachable over by evaluating link state messages (e.g., IS-IS messages) sent by the gateway routers used to construct the emulated switch. Doing so allows the access switch to learn both the ID of an emulated switch and a set of links over which the emulated switch may be reached, thereby allowing the access switch to load balance traffic to the emulated switch.

20 Claims, 8 Drawing Sheets

OPTIMIZATIONS FOR N-WAY GATEWAY LOAD BALANCING IN FABRIC PATH SWITCHING NETWORKS

CROSS REFERENCE TO RELATED APPLICATIONS

This application claims benefit of Indian Patent Application Serial No. 2986/DEL/2011 filed on Oct. 18, 2011, which is incorporated herein by reference in its entirety.

TECHNICAL FIELD

Embodiments presented in this disclosure generally relate to computer networking, and more particularly, to multi-destination forwarding in network environments which include multiple gateways participating in a first hop redundancy protocol (FHRP) group.

BACKGROUND

In order to support progressively more complicated switching and path topologies, data center networks have become increasingly complex. For example, a Layer 2 multipath network (L2MP)—sometimes referred to as a fabric path switching System (FSS) or data center Ethernet—provides a non-blocking Layer 2 architecture that does not rely on the conventional spanning tree protocol to cut loops. That is, unlike a classical Ethernet, a L2MP may be configured to allow multiple paths between nodes at the data link layer (i.e., at the Ethernet layer). Instead, a link state protocol such as Intermediate System to Intermediate System (IS-IS) or Open Shortest Path First (OSPF) may be used to determine multiple, loop-free paths used to send packets to the same destination inside the L2 network.

A data center Ethernet may include a collection of gateway switches at the L2/L3 boundary used to forward frames towards (and receive frames from) destinations outside of the data center. Such gateways may be configured to provide redundancy using a First Hop Routing Protocol (FHRP), such as Hot Standby Router Protocol (HSRP) or Virtual Router Redundancy Protocol (VRRP), and static load balancing may be achieved among the gateways using multiple-group FHRP. However, a large data center network may include 16 or even 32 such gateways. Using the current implementation of HSRP or VRRP does not scale or provide for dynamic load balancing at the L2/L3 boundary as gateways are added (or removed) from an FHRP group. This occurs because the number of paths that must be configured on each access switch grows geometrically with each additional gateway and FHRP group. In such cases, reconfiguring hundreds of routing entries each time a gateway is added (or removed) to a L2MP network is simply impractical.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

One embodiment provides an access switch configured to provide n-way load balancing for layer 2 traffic forwarded to multiple gateways in fabric path switching networks. One embodiment includes a switching device which has at least a processor and a memory, wherein the switching device is configured to perform an operation for performing n-way gateway load balancing in a fabric path switching network. The operation itself may generally include the operation comprising receiving, at an access switch, a first network frame from an active gateway router in a first hop routing protocol (FHRP) group of gateway routers. The first frame may include an emulated switch ID assigned to the FHRP group of routers. In response, the access switch adds an entry to a media access control (MAC) table mapping a MAC address associated with the emulated switch to the emulated switch ID. The operation may further include receiving, at the access switch, one or more link state messages from one or more respective standby gateway routers in the FHRP group, Each of the one or more second link state messages includes the emulated switch ID. In response, for each link state message, the access switch adds an entry to a switch table a link on the access switch over which the emulated switch may be reached.

In a particular embodiment, the operation may further include receiving, from a host attached to the access switch, a frame with a destination address of the emulated switch. In response, the access switch forwards the frame received from the host to a selected one of the group of gateway routers. That is, the gateway router is selected to load balance frames forwarded to the emulated switch across the group of gateway routers.

DESCRIPTION OF EXAMPLE EMBODIMENTS

Embodiments presented herein provide for n-way gateway load-balancing in a fabric path switching Systems (FSS), such as a layer 2 multipath (L2MP) network in a large data center. In one embodiment, a group of gateway routers are configured to provide an emulated switch having a virtual media access control (MAC) address/IP address. The emulated switch is identified using an emulated switch ID. Multiple emulated-switches may be configured on each router, based on failure domain/VLANs other user-defined criteria. As a simple example, two gateway routers could be configured to provide a first emulated switch and a second emulated switch, each with a virtual MAC (VMAC) address and virtual IP address. In such a case, one FHRP group could be used to designate a first gateway router as being "active" for the first emulated switch. And another FHRP group could be configured on the same two gateway routers, where the first gateway router is configured as being "standby" and the second gateway router as being "active" for the second emulated switch. This configuration allows each gateway router to act as a failover for the other. At the same time, because each emulated switch is "active" for at least some traffic (e.g., traffic for different VLANs), neither of the underlying gateway routers remain idle and unused. That is, as each switch forwards traffic there is generally no logical difference between an "active" router and a "standby" router except for ARPs/VIP-pings.

Embodiments described herein allow the FHRPs to more fully operate in an active-active model in order to take full advantage of the Layer 2 multi-pathing available when using multiple gateway routers and to extend load balancing to all Layer 3 traffic. Of course, more than 2 gateway routers may be present in a large L2MP network and each should be available to forward traffic for any VLAN in the data center. However, rather than requiring network administrators to manually configure each access switch with the forwarding settings needed to load balance traffic to a large number of gateway routers—let alone update such settings each time a gateway router is added, removed, or fails—embodiments presented herein provide an approach for an access switch to dynamically generate the L2MP forwarding tables needed to load balance traffic forwarded to (and received from) multiple gateway routers (e.g., in a large data center deployment having 16 or 32 (or more) gateway routers).

In one embodiment, the network administrator determines the FHRP domains and an emulated-switch-id for each domain, as well as maintains this mapping across each gateway router that is part of a given emulated switch. In one embodiment, once configured, an FHRP process in the active gateway router advertises itself using the emulated switch ID. That is, the active gateway router in an FHRP domain sends out "hello" messages used to confirm to one or more standby routers that the "Active" router is operating correctly. For example, the active gateway router may advertise itself to a multicast domain which includes the group of FHRP routers using the emulated switch ID in MAC-in-MAC packets, rather than using the actual router switch ID as is done currently.

Further, access switches which use the emulated switch as a "first hop" for sending (and receiving) Layer 3 traffic may intelligently snoop link-state messages (e.g., IS-IS or OSPF messages) sent from the gateway routers to learn which links on the access switch may be used to forward traffic to the emulated switch. Doing so allows the access switch to load balance traffic to the identified gateways (i.e., to the emulated switch) as well as dynamically determine which switch links the emulated switch may be accessed over. Further, because the load balancing and routing configuration occurs relative to the outer MAC frame addressing for MAC-in-MAC packets of the L2MP frames, embodiments presented herein allow inter-working of L2MP and classical Ethernet networks, as well as provide classical Ethernet network with first-hop redundancy.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 1:
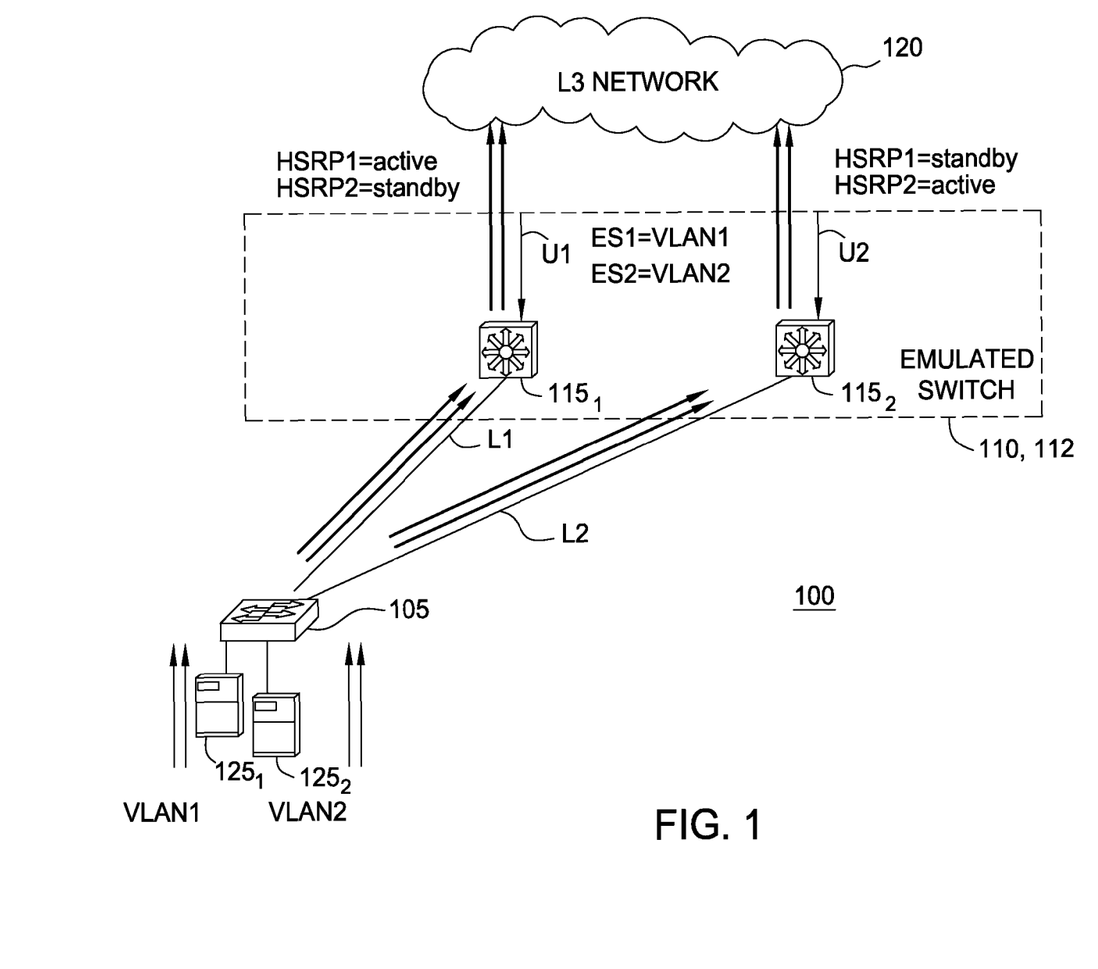
FIG. 1 illustrates an example network computing infrastructure connecting classical Ethernet hosts to a Layer 2 multipath access switch, according to certain embodiments of the present disclosure.

FIG. 1 illustrates the example described above. More specifically, FIG. 1 illustrates a network computing infrastructure 100 connecting classical Ethernet (CE) hosts $125_{1-2}$ to a L2MP access switch 105, according to certain embodiments of the present disclosure. As shown, the access switch 105 is configured to forward layer 3 (L3) traffic for hosts in a first VLAN (e.g., for host $125_1$) to a first emulated switch (ES1) 110 and forward L3 traffic for hosts in a second VLAN (e.g., for host $125_2$) to a second emulated switch (ES2) 112.

Both emulated switches ES1 110 and ES2 112 are configured using a first gateway router $115_1$ and a second gateway router $115_2$. Each gateway router 115 provides a respective uplink (labeled U1 and U2) to a layer 3 network 120. In this example, the first emulated switch (ES1) includes two gateway routers that are part of an FHRP group, where gateway router $115_1$ is active and where gateway router $115_2$ provides a standby failover. Conversely, for the second emulated switch (ES2), an FHRP group has been defined where gateway router $115_2$ is active and gateway router $115_1$ provides a standby failover.

Further, while each of gateway routers 115 is "active" for one VLAN and "standby" for the other, access switch 105 still load balances traffic for both VLAN1 and VLAN2 to both gateway routers 115. As described in greater detail below, access switch 105 may learn the emulated switch IDs (ES1 and ES2) through FHRP "hello" messages sent by the "active" gateway router for a given FHRP group. Further, the access switch 105 learns which links each emulated switch may be reached over by evaluating link state messages (e.g., IS-IS messages) sent by the gateway routers 115. Combining these two elements of information allows the access switch to learn both the ID of an emulated switch and a set of links over which the emulated switch may be reached, allowing the access switch to load balance traffic to the emulated switch.

Figure 2:
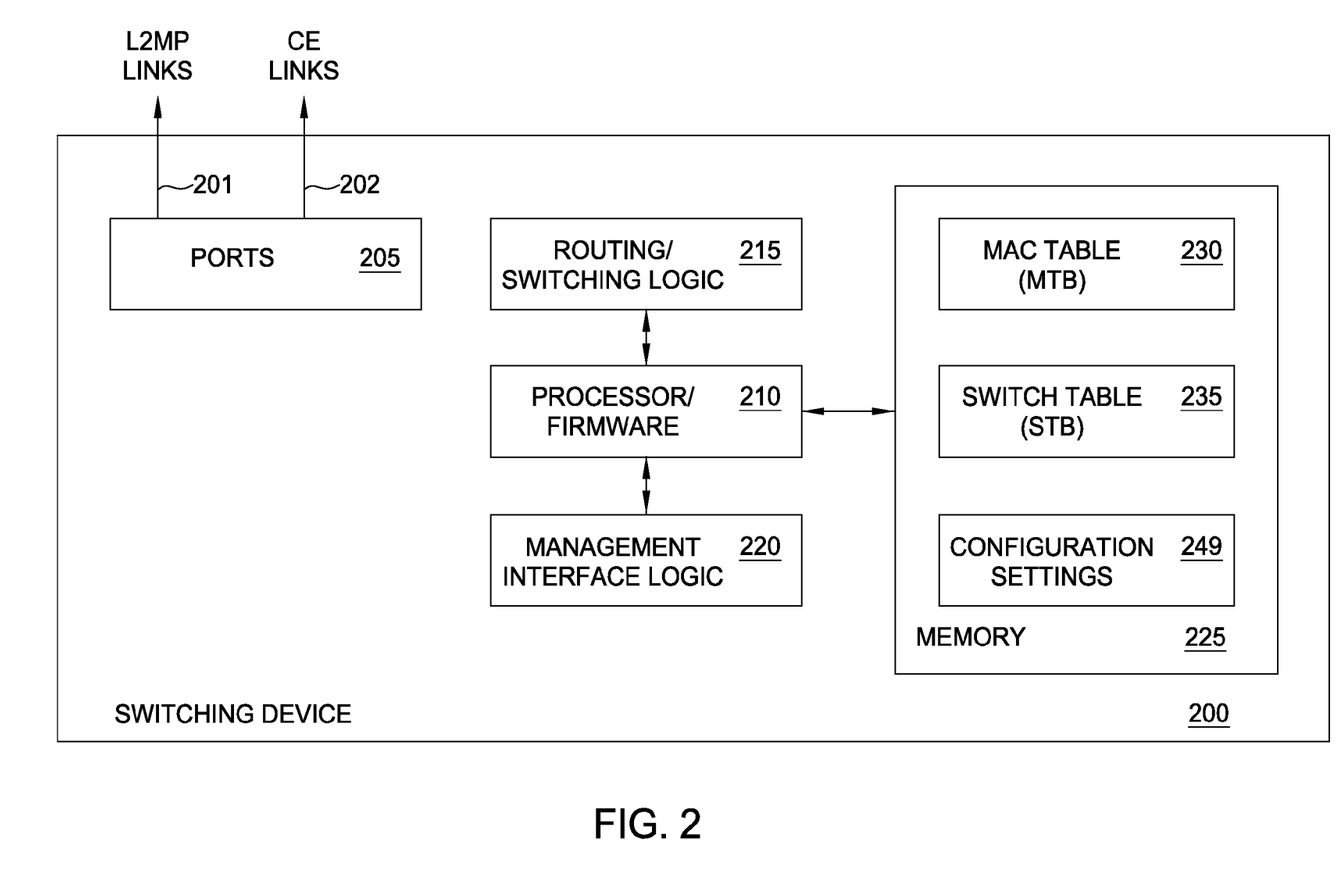
FIG. 2 is a block diagram illustrating an example of a L2MP switching device, according to certain embodiments of the present disclosure.

FIG. 2 is a block diagram illustrating an example of a L2MP switching device 200, according to certain embodiments of the present disclosure. As shown in FIG. 2, the switching device 200 includes ports 205, a processor/firmware 210, routing/switching logic 215, management interface 220, and memory 225. And the memory 225 includes a MAC table (MTB) 230, a switch table (STB) 235, and configuration settings 240. In one embodiment, users may specify configuration settings 240 for the switching device using the management interface 220. In context of this disclosure, e.g., the management interface 220 may be used to enable/disable L2MP routing as well as whether to enable/disable n-way gateway load balancing in the fabric path where a set of routing gateways are used to provide multiple layer 2 outgoing paths for hosts connected to the switching device 200. Of course, one of ordinary skill in the art will recognize that the depiction of a switching device 200 shown in FIG. 2 is simplified to highlight aspects of the embodiments described herein, and that, in practice, network switching/routing devices may be configured with a variety of additional functions, features and components.

Switching device 200 generally represents a layer 2 switch which provides Ethernet connectivity between a large number of hosts and a set of uplinks to gateway devices. In this example, ports 205 include L2MP links 201 (i.e., links to gateway routers) as well as classical Ethernet (CE) links 202. The L2MP links 201 represent the physical cabling connecting the switching device 200 to a set of gateway routers and the CE links 202 represent the physical cabling connecting the switching device 200 to a collection of hosts. Thus, switching device 200 generally corresponds to the access switch 105 of FIG. 1. And, as described above, the L2MP links 202 connect switching device 200 to other switches within a network fabric (e.g., to the gateway router 115), and CE links 202 connect switching device 200 to a set of CE hosts (e.g., hosts 125).

The processor/firmware 210 is generally configured to execute the routing/switching logic 215 to evaluate network frames received over one of the ports 205 and selectively forward such frames over other ports 205 on the switching device 200 (or drop them). The memory 225 includes a variety of structures used by the forwarding logic 210 and processor/firmware 210 to make a forwarding decision. For example, as shown, the memory 225 includes a MAC table (MTB) 230, a switch table (STB) 235, and configuration settings 240. In one embodiment, the MTB 230 provides a mapping from a MAC address to a port 205 over which a host corresponding to that MAC address may be reached. For example, for a conventional Ethernet frame, the access switch may learn an association between a MAC address and a port 205 by inspecting the source address field of an Ethernet frame sent to the switching device 200 by a host connected to one of the CE links 202. Similarly, MAC frames sent by a gateway router may include an actual MAC address for that router or include a virtual MAC address when the gateway router is configured as part of an emulated switch. For an L2MP frame, which may include both an outer MAC header and an inner MAC header, entries in the MTB 230 may provide a mapping between a MAC address identified in the outer source address of the L2MP frame and a switching entity in a fabric path which owns that MAC address. For example, in context of the present disclosure, an entry in the MTB 230 may provide a mapping between a virtual MAC address associated with an emulated switch and a switch ID for that emulated switch.

When a frame (whether a CE frame or an L2MP frame) is received listing the virtual MAC address as a destination, the MTB 230 is then used to determine that such a frame should be forwarded to the switching entity identified in the MTB 230 (e.g., that such a frame should be forwarded to the emulated switch). Further, the links over which the identified switching entity may be reached may be identified in the switch table (STB) 235. More specifically, the STB 235 may include a mapping between one or more switches in the fabric path and the ports 205 over which the switching entity may be reached. In one embodiment, when a switching entity is reachable over multiple links, the switching device 200 may be configured to load balance traffic over the available links. Such load balancing may distribute the traffic relatively equally, but could also favor one link over another (e.g., in the case where one link has a known greater capacity or bandwidth).

As noted, rather than requiring a network administrator to populate the entries in the MTB and STB needed to provide n-gateway load balancing, in one embodiment, the access switch may be configured to learn this information by intelligently monitoring FHRP group messages (typically sent to a multicast destination which includes each switch assigned to an FHRP group) and link state messages used to determine loop free routing topologies (including routing topologies with multiple paths between two layer 2 entities). The process for the access switch 200 to populate the MTB 230 and STB as is further shown in FIGS. 3 and 4.

Figure 3:
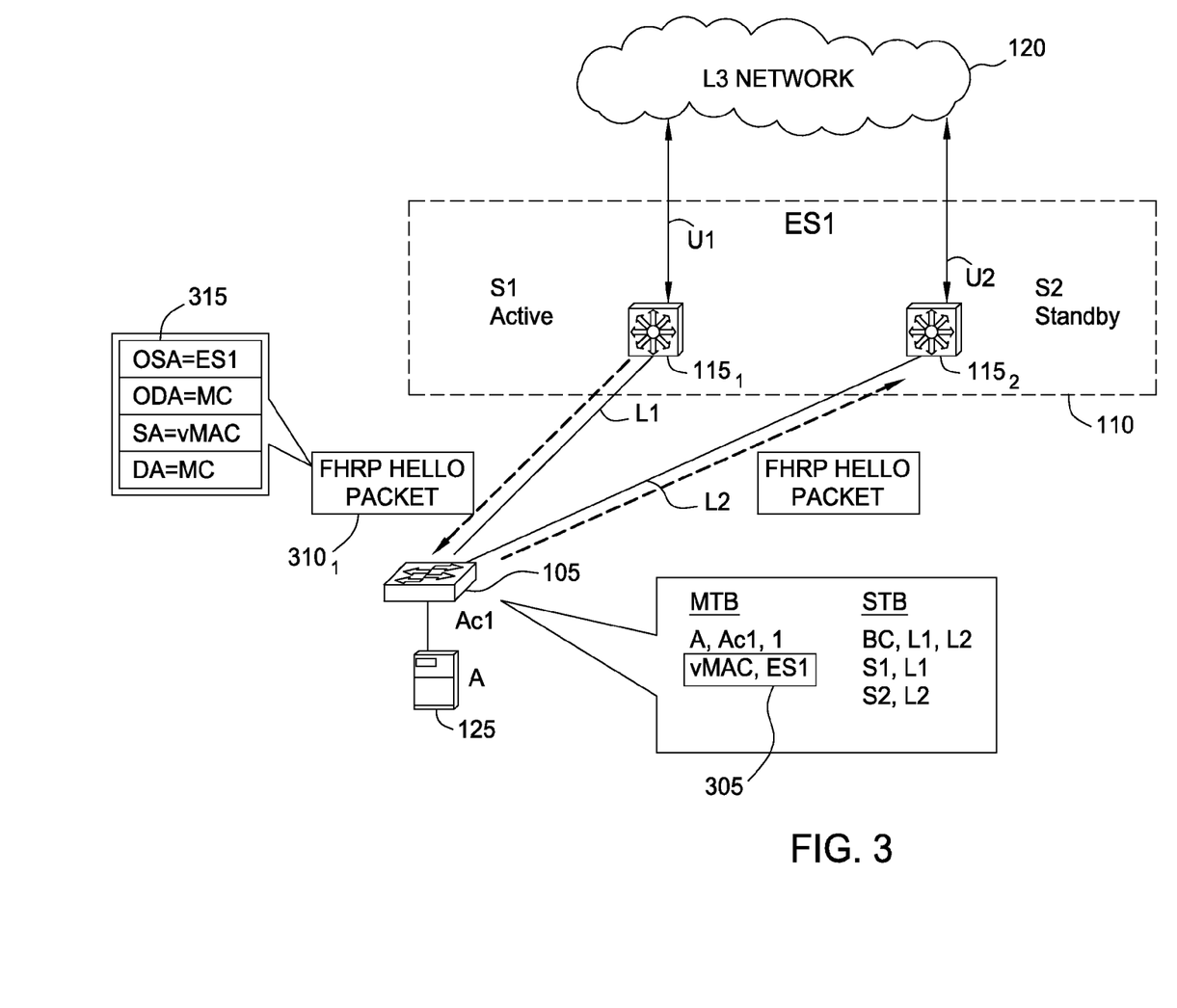
FIG. 3 illustrates an example of configuring a MAC table on the L2MP access switch first shown in FIG. 1, according to certain embodiments of the present disclosure.

First, FIG. 3 illustrates an example of configuring a MAC table on the L2MP access switch 105 first shown in FIG. 1, according to certain embodiments of the present disclosure. In one embodiment, an FHRP group 110 is configured on the gateway routers $115_{1-2}$, designated to be a first hop gateway for the access switch 105. Illustratively, gateway router $115_1$ is designated as "active" for the FHRP group 110 and gateway router $115_2$ is designated as "standby" for the FHRP group 110. Additionally, an emulated switch-id is allocated to each gateway router 115 in the FHRP group 110. More generally, an emulated switch-id may be assigned either on a per-gateway, per-switch virtual interface (SVI), or per-group basis. In this example, a switch ID of "ES1" has been assigned to both gateway router $115_1$ and gateway router $115_2$. Further, multiple FHRP groups 110 may be configured on the gateway routers 115, each designating a different "active" router and set of one or more "standby" routers. In such a case, a different emulated switch ID may be assigned to each gateway router 115 for each FHRP group to which gateway router is assigned.

As shown, access switch 105 learns the entry 305 "VMAC, ES1" in the MTB table from an FHRP hello packet 310 sent from the active gateway router $115_1$ to the access switch 105. In one embodiment, the FHRP hello packet 310 is sent as a "MAC-in-MAC" packet with outer-MAC source address referencing the emulated switch ID (i.e., referencing "ES1" in this example). The outer destination address of "MC" or multicast results in the access switch 105 forwarding the hello packet 310 to one or more standby hosts in the FHRP group 110. In the example of FIG. 3, the access switch 105 forwards the FHRP hello packet 310 to the gateway router $115_2$ (acting as a standby for the FHRP group 110). More generally, due to the periodic hello packets, edge switches learn the reachability of "virtual MACs" to be reachable via an "emulated switch-id" assigned to the router sending the hello packet.

In addition, when host A 125 first comes up, it may send an ARP request to learn the MAC address corresponding to an IP address of the default gateway. In one embodiment, only the "active" router for the FHRP 110 group responds to an ARP request. Further, such a response may identify the virtual MAC address associated with the emulated switch (ES1). Doing so allows the CE hosts attached to access switch 105 (e.g., host 125) to learn the VMAC address to use as the destination address for frames forwarded to the default gateway.

Figure 4:
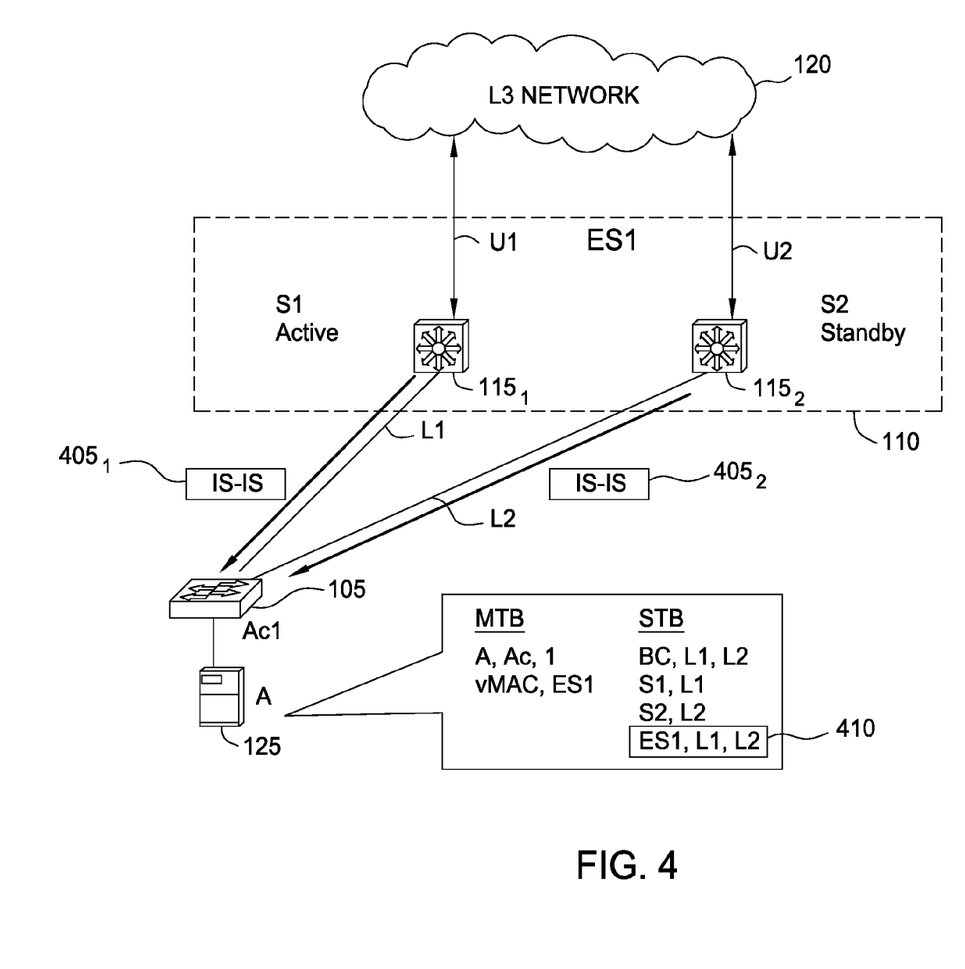
FIG. 4 illustrates an example of configuring a switch table on the L2MP access switch first shown in FIG. 1, according to certain embodiments of the present disclosure.

FIG. 4 illustrates an example of configuring a switch table (STB) on the L2MP access switch 105 first shown in FIG. 1, according to certain embodiments of the present disclosure. As noted, gateway routers assigned to an FHRP group are each assigned an emulated switch ID and the access switch learns the emulated switch ID from hello packets sent by the active gateway router in an FHRP group.

In one embodiment, the access switch 105 may be configured to intelligently monitor link state protocol messages to learn what links the emulated switch ID (learned through FHRP hello messages) is reachable over. For example, gateway routers $115_{1-2}$ may be configured to use a link state protocol (e.g., IS-IS or OSPF) to advertise the reachability of the emulated switch-id (ES1) from each of the routing gateways that are part of the emulated switch, i.e., the routing gateways that are part of the FHRP group. Thus, as shown, gateway router $115_1$ sends an IS-IS message $405_1$ and access switch 105 learns that the emulated switch-id (ES1) may be reached over link 1 (L1). Similarly, gateway router $115_2$ sends an IS-IS message $405_2$ and access switch 105 learns that emulated switch (ES1) may also be reached over link 2 (L2). As a result, switch table includes an entry 410 "ES1, L1, L2," indicating that the emulated switch is reachable over both link 1 and link 2.

Once the access switch 105 learns the links over which the emulated switch is reachable, the access switch 105 can then load balance Ethernet frames. In the example FIG. 4, frames with a destination address of "VMAC" may be load balanced over link 1 (L1) and link 2 (L2). More generally, load balancing can be achieved at L2/L3 boundary for as many gateways as present in a data center Ethernet.

However, problems arise if the uplink on one of the gateway router 115 goes down. In such a case, traffic sent to that gateway router 115 is effectively black-holed. The same situation occurs if one FHRP group on a given SVI on a switch goes down or gets removed. This occurs as access switch 105 make a forwarding decision based on the outer MAC destination address (i.e., on the destination address being the emulated switch-id), or based on a CE frame destination address of VMAC. So long as the corresponding link is reachable, the access switch will continue to load balance traffic over that link.

To detect mis-configurations, each gateway participating in one (or more) FHRPs or configured with SVIs listens to FHRP hello from other gateways. Based on the received hellos messages on the VLAN/group, and based on the local configuration, a gateway may determine whether a mismatch exists. That is, one of the gateway routers 115 may determine whether it may receive traffic that cannot be forwarded to its destination. In case of a mismatch, the routing gateway may withdraw from emulated switch membership corresponding to the affected SVIs or FHRP groups. Once the inconsistency is cleared, the gateway router may enroll back into the emulated switch membership. Note that the "withdrawal" and "enrolling" into emulated switch membership may be achieved using the already existing ISIS protocol used in L2MP for advertising the switch-id reachability.

For example, in one embodiment, when the local switch/router receives a HSRP hello packet with a FHRP group number that is not configured in the local system, that switch/router may conclude that the routers/switches have been configured with group number which is not present in the local system. This might black hole the traffic belonging to that particular group. Accordingly, at this stage the switch is removed from the emulated switch. One or more tracking or status objects can be associated with an FHRP group. Whenever the track object goes down, we decrement the group's priority with the decrement priority associated with the track object. When the priority falls below configured lower threshold the local switch is withdrawn from the emulated switch, concluding that the switch will be unable to forward the data traffic through the upper link. When the tracked object comes back up, then the priority will increase, and once the priority crosses upper threshold, then the switch is added back to emulated switch.

Figure 5:
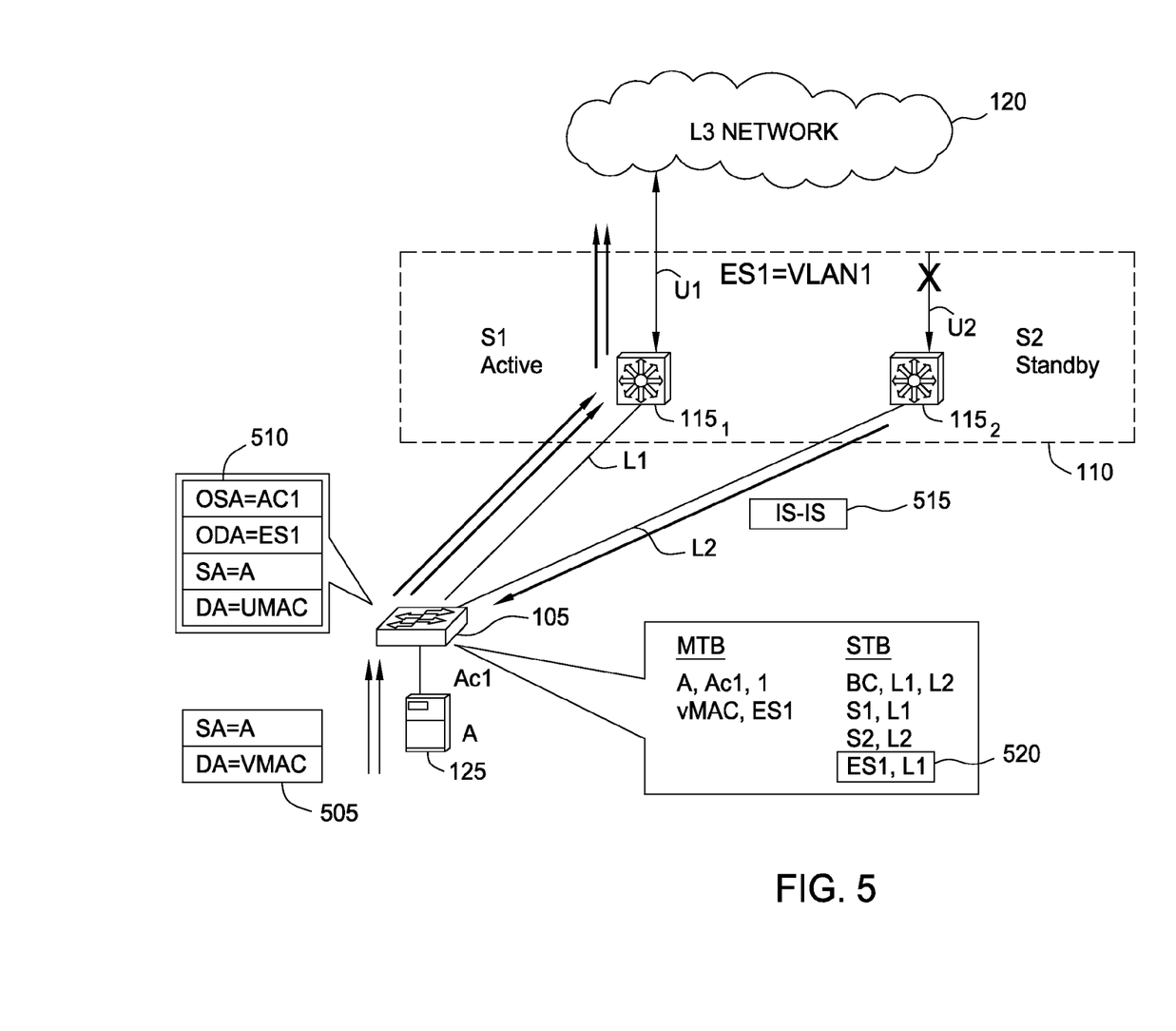
FIG. 5 illustrates an example of the switch table of the L2MP access switch, after being updated in response to a gateway switch failure, according to certain embodiments of the present disclosure.

FIG. 5 illustrates an example of the switch table of the L2MP access switch 105, after being updated in response to a gateway switch failure, according to certain embodiments of the present disclosure. As shown, an uplink to L3 network 120 on gateway router $115_2$ has gone down. As a result, gateway router $115_2$ determines that it needs to withdraw from the emulated switch ES1 and does so by sending an IS-IS message 515 announcing its withdrawal. In turn, access switch 105 modifies an entry 520 in the switch table (STB) to remove the indication that the emulated switch ES1 is reachable over link 2 (L2).

Accordingly, when the access switch 105 receives frames addressed to the virtual MAC address of the emulated switch, it no longer load balances such frames over both link 1 (L1) and link 2 (L2). For example, when a CE host (e.g., host 125) forwards a MAC frame 505 to the access switch 105 with a destination address of VMAC, the access switch 105 wraps the frame 505 with a outer MAC header 510 indicating the source address of the access switch 105 "AC1" and a destination address of the emulated switch (i.e., of ES1). However, as the only link to the emulated switch in the STB is L1, the only link used to send frames to the emulated switch is L1. Once the uplink to L3 network 120 on gateway router $115_2$ is restored, then gateway router $115_2$ may re-enroll in the emulated switch, resulting in access switch 105 restoring the entry in the STB indicating the reachability of the emulated switch over link 2 (L2).

Figure 6:
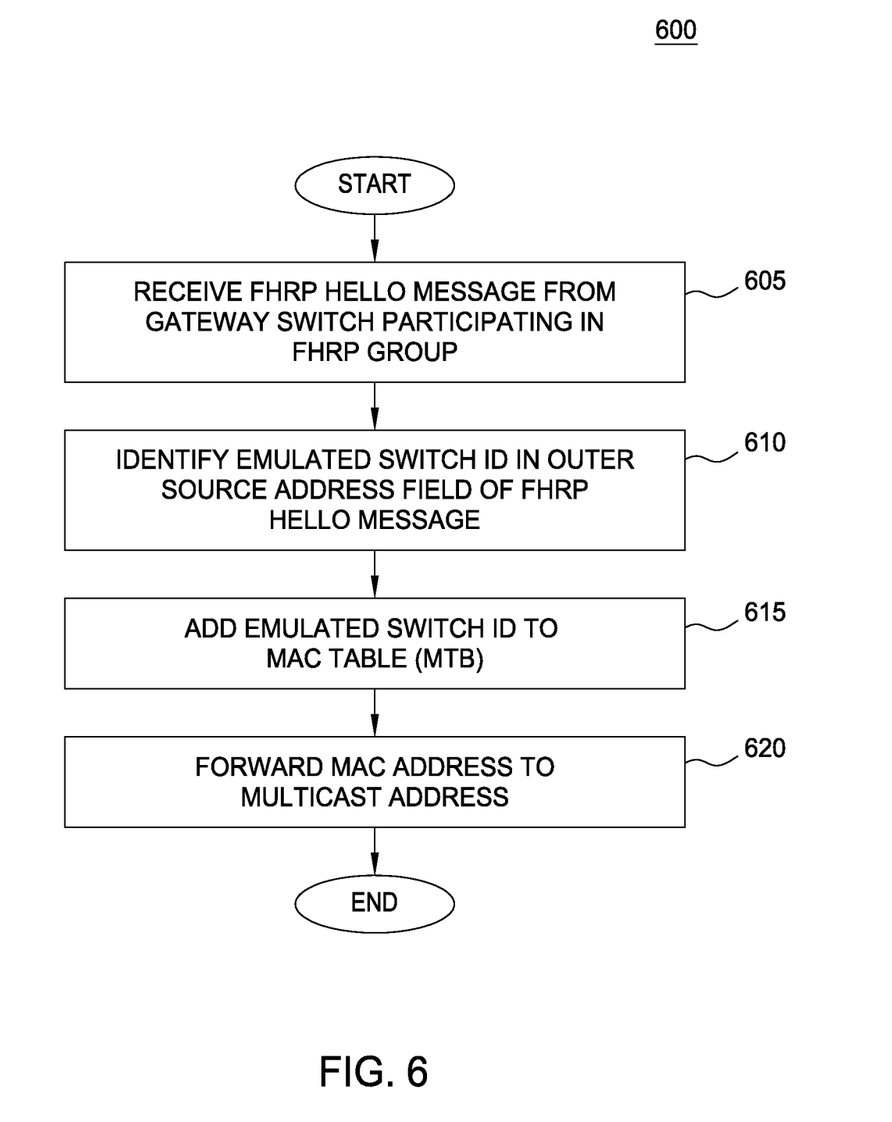
FIG. 6 illustrates a method for populating a MAC table on a L2MP access switch, according to certain embodiments of the present disclosure.

FIG. 6 illustrates a method 600 for populating a MAC table on a L2MP access switch, according to certain embodiments of the present disclosure. As shown, the method 600 begins at step 605, where the access switch or edge switch within a data center Ethernet network receives an FHRP hello message from a gateway switch participating in an FHRP group. In one embodiment, the hello message may be configured according to the known Hot Standby Router Protocol (HSRP) or according to the Virtual Router Redundancy Protocol (VRRP). However, embodiments may be adapted for use with other FHRP protocols as they become available. Additionally, in one embodiment, while a given gateway router may participate in multiple FHRP groups (and emulated switches), only the gateway router configured as the "active" one for a given FHRP group sends the hello message.

At step 610, the access switch identifies an emulated switch ID assigned to an emulated switch configured form the gateway routers participating in the FHRP group. For example, the emulated switch ID may be determined from an outer source address field of a MAC-in-MAC packet used send the hello message. At step 615, the access switch adds the emulated switch ID to the MAC table (MTB). That is, the access switch creates an entry in the MAC table mapping the virtual MAC address to the emulated switch ID. At step 620, the access switch forwards the hello message to a multicast destination address identified in the outer destination address filed of the outer MAC-in-MAC header. That is, the access switch forwards the hello message according to the FHRP protocol, as would occur without the extra processing to create entries in MTB table.

Figure 7:
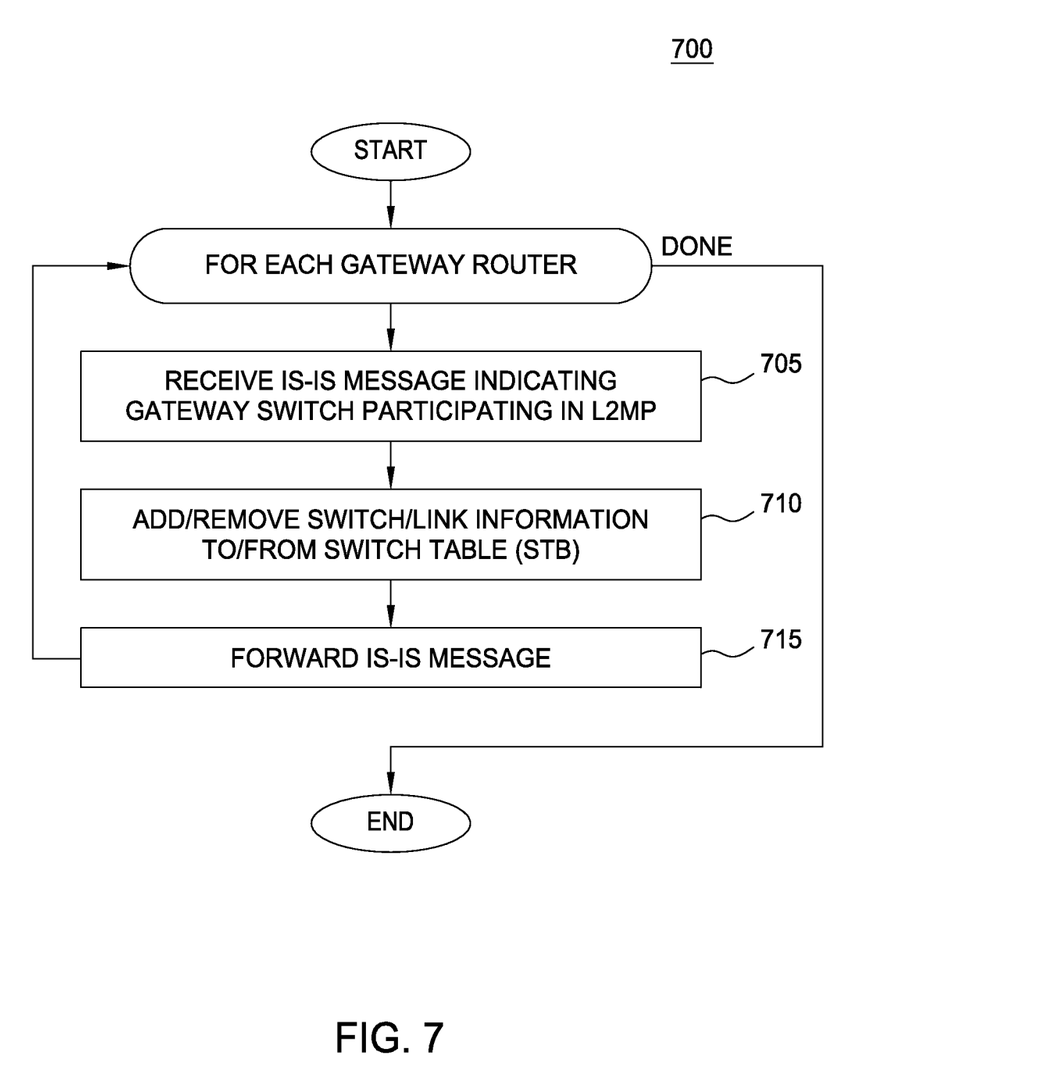
FIG. 7 illustrates a method for populating a switch table on a L2MP access switch, according to certain embodiments of the present disclosure.

FIG. 7 illustrates a method 700 for populating a switch table on a L2MP access switch, according to certain embodiments of the present disclosure. As shown, the method 700 begins at step 705, where an access switch receives a link state protocol message from a gateway router. As noted, the link state protocol message may be configured according to the IS-IS or OSPF link state protocols. However, embodiments may be adapted for use with other link state protocols as they become available. At step 710, the access switch adds an entry to the switch table indicating the reachability of the emulated switch over one of the links on the access switch. Alternatively, if the IS-IS message indicates that a gateway router is withdrawing from the emulated switch, then the switch table may be updated to remove the appropriate link as providing reachability to the emulated switch.

At step 715, the access switch forwards the link state message according to the link state protocol being used and the content of the particular message. Note, steps 705, 710, 715 may be performed for each gateway router included in a given FHRP group. And further, steps 705, 710, 715 may be performed dynamically as the routers in a given FHRP group change (either based on routers being added to or removed from the FHRP group, or when a given router elects to withdraw from an FHRP group on the basis of link failures.

Figure 8:
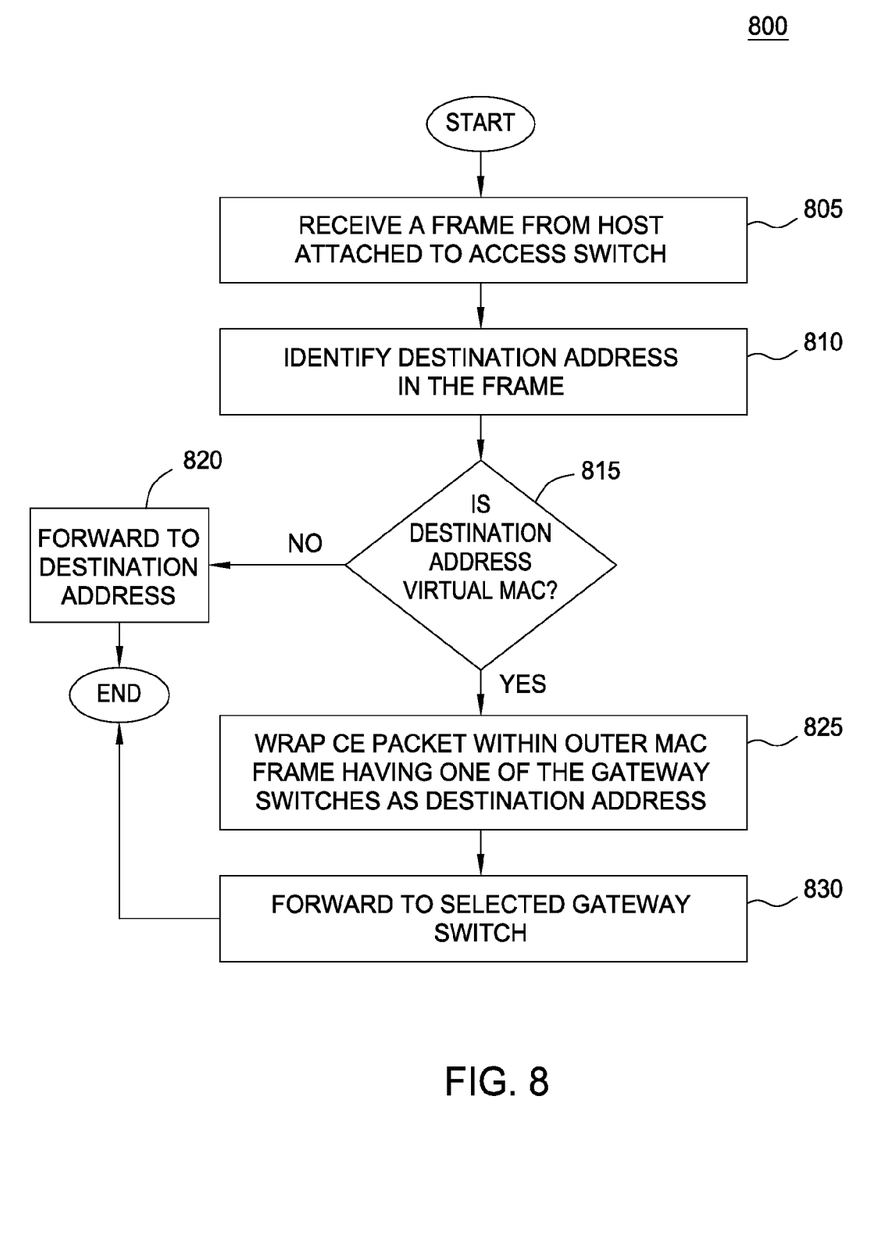
FIG. 8 illustrates a method for n-way gateway load balancing in fabric path switching networks, according to certain embodiments of the present disclosure.

FIG. 8 illustrates a method 800 for n-way gateway load balancing in fabric path switching networks, according to certain embodiments of the present disclosure. Method 800 assumes that an access switch has been configured according to the methods described above. As shown, the method 800 begins at step 805, where the access switch receives a frame from an attached host. As noted, e.g., the access switch may connect a plurality of classical Ethernet (CE) hosts to an emulated switch itself constructed from multiple gateway routers. At step 810, the access switch identifies a destination address in the received frame. That is, the access switch identifies a MAC address in the destination address field of a MAC header in the received frame. At step 815, the access switch determines whether the destination address indicates whether received frame should be forwarded to the emulated switch. For example, using the network topology discussed above, the access switch 105 determines whether the received frame has a destination address of "VMAC."

If the destination address is another one of the connected hosts (e.g., another CE host connected to the access switch) then the access switch forwards the frame over a link which the destination address may be reached (step 820). Otherwise, at step 825, if the destination address indicates a destination within the data center Ethernet or fabric path network (e.g., a destination address of the virtual MAC address assigned to an emulated switch) then the access switch wraps the frame with an outer MAC header (creating a MAC-in-MAC frame). The other MAC frame header includes a source address of the access switch and a destination address of the emulated switch. Additionally, the access switch may select a link by evaluating a switch table which lists one or more links over which the emulated switch is reachable. If multiple links to the emulated switch are in the switch table, then the access switch may select one in a manner to load balance the switch over each available link. As noted, the load balancing may distribute traffic to each link relatively equally, but could also favor one link over another (e.g., in the case where one link has a known greater capacity or bandwidth). At step 830, the access switch forwards the MAC-in-MAC frame over the selected link.

Advantageously, the example embodiments described above provide for n-way gateway load-balancing in a fabric path switching systems (FSS), such as a layer 2 multipath (L2MP) network in a large data center. As described above, an access switch in a L2MP network may learn an emulated switch IDs through FHRP "hello" messages sent by an "active" gateway router for each FHRP group. Further, the access switch may learn which links an emulated switch is reachable over by evaluating link state messages (e.g., IS-IS messages) sent by the gateway routers used to construct the emulated switch. Doing so allows the access switch to learn both the ID of an emulated switch and a set of links over which the emulated switch may be reached, thereby allowing the access switch to load balance traffic to the emulated switch.

While the forgoing is directed to exemplary embodiments, other and further embodiments may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method to facilitate traffic load balancing among gateway routers providing an emulated switch in a fabric path switching network, the computer-implemented method comprising:
   upon receiving, at an access switch, a first network frame from an active gateway router in a group of gateway routers providing an emulated switch having an emulated switch ID and a MAC address, wherein the frame includes the emulated switch ID, adding an entry to a media access control (MAC) table on the access switch mapping the MAC address of the emulated switch to the emulated switch ID of the emulated switch;
   upon receiving, at the access switch, one or more link state messages from one or more respective standby gateway routers in the group, wherein each of the one or more link state messages includes the emulated switch ID, then for each link state message, adding an entry to a switch table indicating a link on the access switch over which the emulated switch is reachable, wherein the access switch is configured to load balance traffic to the emulated switch based on the MAC table and the switch table;
   forwarding a frame to one of the group of gateway routers, that is selected in order to load balance frames forwarded to the emulated switch, across the group of gateway routers; and
   upon receiving, from a given one of the gateway routers, a link state message indicating that the given gateway router is withdrawing from the group, removing the entry in the switch table indicating the emulated switch is reachable over the link corresponding to the given gateway router.

2. The computer-implemented method of claim 1, wherein the group comprises a first hop routing protocol (FHRP) group, wherein the computer-implemented method further comprises:
   receiving the frame from a host attached to the access switch, wherein the frame specifies a destination address of the emulated switch.

3. The computer-implemented method of claim 2, further comprising:
   prior to forwarding the frame received from the host to the selected gateway router, encapsulating the network frame with a outer MAC header, wherein the outer MAC header includes a source address associated with the access switch and a destination address associated with the emulated switch.

4. The computer-implemented method of claim 1, wherein the group comprises a first hop routing protocol (FHRP) group, wherein the switch table is separate from the MAC table, wherein the MAC table is generated based on FHRP hello messages and without requiring user input, wherein the switch table is generated based on link state messages and without requiring user input, wherein the frame, sent by the active gateway router as an FHRP hello message in order to indicate that the activate gateway router is properly functioning, includes the emulated switch ID in lieu of a router switch ID.

5. The computer-implemented method of claim 4, wherein by virtue of the MAC table and the switch table, the access switch is configured to load balance traffic to the emulated switch and in fabric path switching network, without requiring an administrator to reconfigure any routing entry on the access switch upon each gateway being added to and each gateway being removed from the FHRP group, thereby facilitating Layer 2 multipathing when using multiple gateway routers and thereby facilitating extension of load balancing to Layer 3 traffic, wherein the access switch is configured to load balance traffic to the emulated switch in a manner that supports interoperation of Layer 2 multipath (L2MP) and Ethernet networks and that provides first-hop redundancy for Ethernet networks.

6. The computer-implemented method of claim 5, wherein the access switch is configured to automatically learn emulated switch IDs based on the FHRP hello messages sent by the active gateway router of the FHRP group, wherein the access switch is further configured to automatically learn which links each emulated switch may be reached over based on link state messages sent by gateway routers, wherein in a given instance, the traffic load balancing favors a first link over a second link due to the first link having a greater bandwidth than the second link;

wherein configuration settings for the access switch are specified based on user input received via a management interface for the access switch, wherein L2MP routing of the access switch is selectively enabled and disabled via the management interface, wherein traffic load balancing of the access switch is selectively enabled and disabled via the management interface, wherein the link state messages are used to determine loop-free routing topologies in the fabric path switching network, which is configured as a L2MP network providing a non-blocking Layer 2 network environment.

7. The computer-implemented method of claim 6, wherein in respective instances, at least one emulated switch ID in the fabric path switching network is assigned on a per-gateway-router basis, a per-switch virtual interface (SVI) basis, and a per-group-of-gateway-routers basis, respectively, wherein MAC frames sent by a given gateway router in the fabric path switching network, in respective instances: (i) an actual MAC address when the given gateway router is not configured as part of an emulated switch and (ii) a virtual MAC address when the given gateway router is configured as part of an emulated switch;

wherein the access switch is operatively connected to a host, wherein the host is configured to send an Address Resolution Protocol (ARP) request to learn the MAC address corresponding to an Internet Protocol (IP) address of a default gateway router, wherein only the active router of the FHRP group sends a response to the ARP request, wherein the response identifies one or more virtual MAC addresses associated with the emulated switch, thereby permitting the host to learn virtual MAC addresses to use as destination addresses for frames forwarded by the host to the default gateway router.

8. The computer-implemented method of claim 7, wherein a given gateway router determines, based on FHRP hello messages from other gateways, that a misconfiguration exists, whereupon the given gateway router is configured to withdraw emulated switch membership corresponding to, in respective instances, one or more affected SVIs and one or more FHRP groups, wherein the given gateway router is further configured to reenroll into emulated switch membership upon determining that the misconfiguration is rectified;

wherein the misconfiguration is characterized by the given gateway router potentially receiving traffic that cannot be forwarded to its destination, wherein the misconfiguration arises, in respective instances, due to: (i) a gateway router uplink going down, in which case traffic sent to the given gateway router is black-holed; (ii) a given FHRP group on a given SVI on a switch going down; and (iii) the given FHRP group getting removed; wherein the given gateway router comprises, in respective instances: (i) a gateway participating in at least one FHRP and (ii) a gateway configured with at least one SVI.

9. The computer-implemented method of claim 8, wherein a given FHRP group has an associated group priority, wherein one or more tracking objects are associated with the given FHRP group, each tracking object associated with a respective decrement priority by which the group priority of the given FHRP group is decremented when the respective tracking object goes down, wherein a local switch is withdrawn from the emulated switch upon the group priority falling below a predefined threshold in anticipation of the local switch being unable to forward traffic through its uplink, wherein the local switch is subsequently added back to the emulated switch upon the group priority increasing to at least the predefined threshold;

wherein at least a first gateway router participates in multiple FHRP groups, wherein in a given instance, only the gateway router configured as the active gateway router for a given FHRP group is configured to send a FHRP hello message, and each standby gateway router for the given FHRP group is precluded from sending any FHRP hello message.

10. The computer-implemented method of claim 9, wherein the FHRP protocol comprises, in respective instances, Hot Standby Router Protocol (HSRP) and Virtual Router Redundancy Protocol (VRRP), wherein at least one of the one or more link state messages is compliant with a link state protocol, wherein the link state protocol comprises, in respective instances, intermediate-system to intermediate-system (IS-IS) and Open Shortest Path First (OSPF);

wherein multiple FHRP groups are configured on the group of gateway routers, wherein each group is assigned a distinct emulated switch ID, wherein each group has a distinct gateway router designated as an active gateway router for the respective group, wherein each group has a distinct set of gateway routers designated as one or more standby gateway routers for the respective group.

11. The computer-implemented method of claim 10, wherein the computer-implemented method further comprises:

receiving, from the host, a frame with a destination address of the emulated switch;

encapsulating the network frame with a outer MAC header, wherein the outer MAC header includes a source address associated with the access switch and a destination address associated with the emulated switch;

forwarding the encapsulated frame to a selected one of the group of gateway routers, wherein the gateway router is selected in order to load balance frames forwarded to the emulated switch across the group of gateway routers;

receiving a second link state message from a given one of the gateway routers indicating that the given gateway router is withdrawing from the FHRP group; and removing the entry in the switch table indicating the emulated switch is reachable over the link corresponding to the given gateway router.

12. The computer-implemented method of claim 1, wherein the group comprises a first hop routing protocol (FHRP) group.

13. A non-transitory computer-readable medium storing code for execution by a central processing unit (CPU), wherein the code, when executed by the CPU, performs an operation to facilitate traffic load balancing among gateway routers providing an emulated switch in a fabric path switching network, the operation comprising:

upon receiving, at an access switch, a first network frame from an active gateway router in a group of gateway routers providing an emulated switch having an emulated switch ID and a MAC address, wherein the frame includes the emulated switch ID, adding an entry to a media access control (MAC) table on the access switch mapping the MAC address of the emulated switch to the emulated switch ID of the emulated switch;

upon receiving, at the access switch, one or more link state messages from one or more respective standby gateway routers in the group, wherein each of the one or more link state messages includes the emulated switch ID, then for each link state message and by operation of the CPU, adding an entry to a switch table indicating a link on the access switch over which the emulated switch is reachable, wherein the access switch is configured to load balance traffic to the emulated switch based on the MAC table and the switch table;

forwarding a frame to one of the group of gateway routers, that is selected in order to load balance frames forwarded to the emulated switch, across the group of gateway routers;

upon receiving, from a given one of the gateway routers, a link state message indicating that the given gateway router is withdrawing from the group, removing the entry in the switch table indicating the emulated switch is reachable over the link corresponding to the given gateway router.

14. The non-transitory computer-readable medium of claim 13, wherein the group comprises a first hop routing protocol (FHRP) group, wherein the operation further comprises:

receiving the frame from a host attached to the access switch, wherein the frame specifies a destination address of the emulated switch.

15. The non-transitory computer-readable medium of claim 14, wherein the operation further comprises:

prior to forwarding the frame received from the host to the selected gateway router, encapsulating the network frame with a outer MAC header, wherein the outer MAC header includes a source address associated with the access switch and a destination address associated with the emulated switch.

16. The non-transitory computer-readable medium of claim 13, wherein the group comprises a first hop routing protocol (FHRP) group.

17. A system to facilitate traffic load balancing among gateway routers providing an emulated switch in a fabric path switching network, the system comprising:

a switching device comprising at least a processor and a memory, wherein the switching device is configured to perform an operation comprising:

upon receiving, at an access switch, a first network frame from an active gateway router in a group of gateway routers providing an emulated switch having an emulated switch ID and a MAC address, wherein the frame includes the emulated switch ID, adding an entry to a media access control (MAC) table on the access switch mapping the MAC address of the emulated switch to the emulated switch ID of the emulated switch;

upon receiving, at the access switch, one or more link state messages from one or more respective standby gateway routers in the group, wherein each of the one or more link state messages includes the emulated switch ID, then for each link state message, adding an entry to a switch table indicating a link on the access switch over which the emulated switch is reachable, wherein the access switch is configured to load balance traffic to the emulated switch based on the MAC table and the switch table forwarding a frame to one of the group of gateway routers, that is selected in order to load balance frames forwarded to the emulated switch, across the group of gateway routers; and upon receiving, from a given one of the gateway routers, a link state message indicating that the given gateway router is withdrawing from the group, removing the entry in the switch table indicating the emulated switch is reachable over the link corresponding to the given gateway router.

18. The system of claim 17, wherein the group comprises a first hop routing protocol (FHRP) group, wherein the operation further comprises:

receiving a frame from a host attached to the access switch, wherein the frame specifies a destination address of the emulated switch.

19. The system of claim 18, wherein the operation further comprises:

prior to forwarding the frame received from the host to the selected gateway router, encapsulating the network frame with a outer MAC header, wherein the outer MAC header includes a source address associated with the access switch and a destination address associated with the emulated switch.

20. The system of claim 18, wherein the group comprises a first hop routing protocol (FHRP) group.

* * * * *